United States Patent [19]

Anderson et al.

[11] Patent Number: 4,871,569

[45] Date of Patent: Oct. 3, 1989

[54] DUAL-STREAM JUICE PROCESSING FOR RECOVERING JUICE SOLIDS FROM EXTRACTOR CORE MATERIAL

[75] Inventors: Barry J. Anderson, Blue Ash, Ohio; Dale S. Arand, Winter Haven, Fla.

[73] Assignee: The Procter & Gamble Company, Cincinnati, Ohio

[21] Appl. No.: 194,792

[22] Filed: May 17, 1988

[51] Int. Cl.$^4$ ............................................. A23P 1/00
[52] U.S. Cl. ..................................... 426/489; 426/495
[58] Field of Search ................ 426/489, 495; 210/781, 210/782

[56] References Cited

U.S. PATENT DOCUMENTS

| | | | |
|---|---|---|---|
| 2,267,048 | 12/1941 | Schwarz | 426/489 |
| 2,724,652 | 11/1955 | Brent et al. | 426/489 |
| 2,890,961 | 4/1959 | Davis | 426/495 |
| 2,977,234 | 3/1961 | Wenzelberger | 210/781 |
| 3,042,528 | 7/1962 | Rowse | 426/489 |
| 3,172,770 | 3/1965 | Miller | 426/489 |
| 3,301,685 | 1/1967 | Harwell | 426/475 |
| 3,318,709 | 5/1967 | Cygan et al. | 426/481 |
| 3,346,392 | 9/1967 | Lowe et al. | 426/481 |
| 3,670,888 | 6/1972 | Boroughs et al. | 210/781 |
| 3,814,246 | 6/1974 | Wilson et al. | 210/781 |
| 4,119,542 | 8/1978 | Yamaoka et al. | 210/360 |
| 4,313,372 | 6/1982 | Gerow et al. | 99/483 |
| 4,518,621 | 2/1985 | Alexander | 426/495 |
| 4,759,938 | 7/1988 | Rohm | 426/489 |
| 4,774,097 | 9/1988 | Bushman et al. | 426/489 |

FOREIGN PATENT DOCUMENTS 622820  7/1981  Switzerland.

OTHER PUBLICATIONS

TEMA, Inc. publication, TEMA Subtechnik Centrifuges, pp. 4 to 6.

*Primary Examiner*—Peter Kratz
*Attorney, Agent, or Firm*—Rose Ann Dabek; Chester Cekala; Richard C. Witte

[57] ABSTRACT

Disclosed is a method for recovering residual juice solids present in the extractor core or waste material from citrus juice extraction. In this method, citrus fruit is processed in a juice extraction and finishing system to provide a primary juice stream and extractor core or waste material containing rag, seeds, peel plugs and residual juice solids. Without adding water, the extractor core material is processed in a centrifugal filter to provide a secondary juice stream. The preferred citrus fruit is orange juice and the preferred extraction system is a reciprocating cup-type juice extractor.

17 Claims, No Drawings

DUAL-STREAM JUICE PROCESSING FOR RECOVERING JUICE SOLIDS FROM EXTRACTOR CORE MATERIAL

TECHNICAL FIELD

This application relates to a method for processing citrus fruit, especially oranges, to provide two juice streams. In particular, one of these juice streams comprises juice solids which have been recovered from extractor core materials.

There are a variety of juice extractors which are used to commercially process fruit. One type of juice extractor used in the citrus industry is referred to as a "reciprocating cup-type". This extractor produces a juice and pulp stream which is further processed in a finisher to remove the pulp from the juice stream. The juice can be processed further, e.g. concentrated or made into beverages or foods. Rag, seeds and peel plugs remains inside the tube of the extractor, and is referred to as "extractor core material". This core material is often discarded or further processed into molasses or cattle feed or fodder. However, in addition to rag, seed and peel plugs, this core material also contains recoverable residual juice solids. These juice solids represent "lost" juice yield.

One method for recovering these residual juice solids is to wash them from the core material with water. The extracted juice solids (primarily sugar solids) are processed further to provide a "core wash stream". Because of the added water, this core wash stream cannot be included in 100% orange juice products and still meet the standard of identity set forth by the Florida Department of Citrus. Instead, it is used in preparing dilute juice products or mixed with other fruit juices.

Because this core wash stream is so dilute, the energy costs to process it are greatly increased. Accordingly, it is highly desirable to have a method which recovers residual juice solids from the extractor core material in a way such that these recovered juice solids are not diluted with water, or otherwise adulterated.

The recovery of this secondary juice increases the yield from the fruit to a level equal to the yield from heavy extraction. Heavy extraction, which involves more pressure on the orange or fruit, increases pulp yield and provides more juice. However, the pulp recovered in heavy extraction is not suitable for use in products. The process herein allows good pulp collection with high yield of juice from the same amount of fruit.

BACKGROUND ART

U.S. Pat. No. 3,346,392 to Lowe et al, issued Oct. 10, 1967, describes a process for obtaining clear fruit juices, especially apple juice. The objectiveof the Lowe et al process is to maximize yield, while minimizing the amount of suspended material so that the juice can be clarified without undue expense. This is achieved by obtaining the juice in two distinct stages. In the first stage, pulverized pulp is subjected to centrifugation under conditions which provide only a limited proportion of the juice from the pulp (e.g. from 50 to 60% by weight of the original pulp). The remaining centrifuged pulp is subjected to screw pressing in the second stage. The two juice streams are then combined.

U.S. Pat. No. 2,890,961 to Davis, issued June 16, 1959, relates to a process and apparatus for obtaining juice from fruit, including citrus fruit, for subsequent evaporative concentration. As exemplified in Davis, the peeled pineapples are fed to disintegrator or attrition mill to provide both a juice stream and a pulp stream. The juice stream is then processed by a finisher to provide an additional pulp stream and a primary juice stream. The two pulp streams are combined and then processed by a finisher to provide a secondary juice stream. This secondary juice stream is then combined with primary juice stream for additional processing. The Davis patent indicates that orange fruit could be substituted for peeled pineapples in this process (see Col. 5, lines 17–18).

U.S. Pat. No. 3,301,685 to Harwell Corp.), issued Jan. 31, 1967, relates to a process for producing stable juice pulp, especially from orange fruit. Orange fruit is extracted to yield juice and pulp, plus peel, rag and seed in an extractor. This extracted juice and pulp is separated into three streams, the first juice stream being processed by a heavy pulp finisher to provide a pulpy fraction and a liquid juice fraction. Subsequent processing of pulpy fraction eventually results in a second juice stream. The juice fraction from the pulp finisher is combined with the initial juice stream and then processed by a fine finisher. This results in a pulp stream and a liquid juice stream which is combined with first juice stream and then concentrated. The third juice stream from the extractor is processed by cutback finisher and eventually results in a cutback juice stream which is blended with concentrated juice.

Disclosure of the Invention

The present invention relates to a method for recovering residual juice solids from citrus fruit extractor core material by centrifugal filtering. This method comprises the steps of:

1. processing citrus fruit, preferably oranges, in a juice extraction and finishing system to provide a primary juice stream and an extractor core material containing rag, seeds, peel plugs and residual juice solids; and
2. without adding water or other solvent, processing the extractor core material in a centrifugal filter to provide a secondary juice stream comprising residual juice solids. Preferably the juice extraction system is a reciprocating cup-type extractor.

The method of the present invention provides two juice streams. The primary juice stream provided by the juice extractor contains most of the juice solids and pulp from the citrus fruit. The other, secondary juice stream contains additional juice solids which have been recovered from the extractor core material. However, unlike core wash recovery systems, the method of the present invention recovers the juice solids from the core material without addition of water, other solvent or carrier. Accordingly, the juice solids in this secondary stream can be included in 100% orange juice products. In addition, the juice solids in this secondary stream are equal or higher in juice solid content than the primary system. Energy costs to concentrate this secondary stream are lower relative to a core wash recovery system which necessarily dilutes the solids with water. The yield of 100% juice from the fruit is increased at no loss in recovered pulp.

Brief Description of the Overall Method of Present Invention

The method of the present invention starts with citrus fruit and ends up with a primary juice stream and a secondary juice stream. The fruit is initially processed in an extractor, preferably a reciprocating cup-type extractor to provide a juice and pulp stream. This juice and pulp stream is usually processed in a finisher where larger pulp particles are removed to provide the primary juice stream.

The extractor provides residual core material composed primarily of rag, seeds and peel plugs, as well as residual juice solids. This extractor core material is processed in a centrifugal filter to recover at least a portion of the residual juice solids as a secondary juice stream. The remaining separated waste which primarily comprises rag, seeds and peel plugs can be disposed of in an appropriate manner or processed further to recover more of the remaining juice solids, or into molasses and animal feed.

The primary and secondary juice streams can be utilized in various ways. The secondary juice stream can be added directly to the primary juice stream and processed further into 100% juice products in various proportions. Such processing includes concentration. The secondary juice stream can be processed to provide other juice products as well.

While the above description summarizes the overall method of the present invention, the preparation of the primary and secondary juice streams, and their utilization in various juice products, is provided in greater detail in the following description:

A. Processing of Citrus Fruit to Provide Primary Juice Stream

The primary juice stream is the juice extracted from the fruit from which pulp greater than 1 mm has been removed. The size of the pulp depends on the finisher used. Preferably, pulp greater than 0.5 mm is removed from the juice. The pulp is usually removed to avoid having it clog the evaporation and/or mixing equipment.

The preferred fruit for use herein is oranges. As used herein, "Valencia orange fruit" refers to orange fruit from the genotype or variety Valencia which usually mature late in the respective harvest season. Examples of suitable Valencia fruit include Florida Valencia fruit, California Valencia fruit and Brazilian Valencia fruit.

Examples of other suitable orange fruits include the Florida Early/Midseason oranges (Hamlin, Parson Brown and Pineapple), Brazilian varieties such as Pera Rio and Natal, as well as tangerines, mandarin oranges and blood oranges.

Other citrus fruits that can be used in this process include grapefruit, lemons, limes, and similar citrus materials.

The first step in obtaining the primary juice stream is to select processable fruit. As used herein, the term "processable fruit" refers to fruit which can be processed with commercial juice extraction and finishing equipment to provide primary juice streams having a ratio of Brix solids to titratable acidity (TA) of from about 10 to about 24, preferably from about 12 to about 20.

Soft, rotten or immature fruit are preferably removed to prevent the introduction of undesired contaminants into the primary juice stream. These fruits also affect the solids ratio of the juice and the overall flavor. In addition, the selected fruit is preferably processed within about 48 hours of being harvested. This minimizes the development of off-flavor compounds in the fruit which occurs over time, especially as the result of abuse and damage during storage.

The selected fruit is extracted in a commercial extractor to provide extracted juice. Any commercial juice extraction system can be used. Commercial reciprocating cup-type juice extractors are preferred for the method herein. They are capable of processing at least 200 fruit per minute, and can go as high as 500 oranges per minute. In a reciprocating cup-type extractor, each fruit is deposited in a lower cup. The upper cup of the extractor then descends which causes the sharp upper end of a round steel tube to but a circular hole in the bottom of the fruit. As the plurality of fingers of the upper and lower cups mesh, the expressed juice-laden segments pass into the tube through the hole cut in the fruit. The lower end of the tube has a restrictor to prevent the loss of juice and to force the juice and smaller sized pulp through perforations in the side of the tube. See Nagy et al, *Citrus Science & Technology*, Vol. 2 (1977), pp. 190-191. Examples of suitable reciprocating cup-type juice extractors include the FMC Model 291, the FMC Model 391, and the FMC Model 491 juice extractors, manufactured by FMC Corporation, Citrus Machinery Division of Lakeland, Fla. See also U.S. Pat. No. 4,376,409 to Belk, issued Mar. 15, 1983, and U.S. Pat. No. 4,309.943 to Larson et al, issued Jan. 15, 1982 for other examples of suitable reciprocating cup-type juice extractors.

The juice and pulp stream obtained from the reciprocating cup-type juice extractor can have various levels of titratable peel oil. The level of oil depends in part on the pressure in squeezing the fruit as well as the oil content of the fruit. Usually, the level of titratable peel oil in this stream is equal to or less than about 0.10%.

Generally, juice and pulp streams obtained from Florida Valencia oranges have higher levels of titratable peel oil than those obtained from Florida early/mid-season fruits. Valencia juice can range from about 0.010% to about 0.070%. (The titratable peel oil content of the juice and pulp stream can be measured by the Scott Oil Method disclosed in Nagy et al, *Citrus Science and Technology*, Vol. 2 (1977), pp. 506-508.)

If lower titratable peel oil levels in the juice and pulp stream are desired, an optional step prior to juice extraction is to de-oil fruit. De-oiling of fruit can be achieved by using a scarifier device. Scarifiers work by pricking the surface of the orange fruit. This permits peel oil to exude out of the fruit. The exuded peel oil can be washed off of the fruit and removed to prevent its inclusion in the extracted juice. Suitable scarifiers for carrying out this de-oiling step include Brown Oil Extractors, Indelicato Scarifiers or Bertuzzi Citro Raps. Although de-oiling can reduce the level of titratable peel oil, it can also reduce the yield of juice during extraction of the fruit. Pulp is removed from the juice and pulp stream to provide a finished, primary juice stream. Pulp is recovered on a screen having a hole size which is less than 1.0 mm, and preferably less than 0.5 mm in size. Pulp can be removed from the juice and pulp stream by any suitable screw-type or paddle-type juice finisher. Examples of suitable screw-type finishers include Brown Model 2503 and 3600 screw finishers, FMC Model 35 screw finisher, and preferably FMC Model UCF 200 "close tolerance" finishers. Examples of suitable paddle-type finishers include the Brown Model 200 paddle finisher. See Nagy et al, supra, at pp. 196–99.

Pulp imparts desirable mouthfeel properties to juice products. However, in order to properly process the primary juice stream, pulp must be removed. Pulp absorbs desirable orange aroma and flavor compounds, particularly the oil components. These compounds are not easily removed from pulp during any volatile stripping of a juice stream to make aqueous essence and essence oil.

Any pulp greater than about 0.5 mm present in the primary juice stream can: (1) build up and plug equipment used in evaporative concentration; or (2) affect the juice flow pattern through the evaporators, thus lowering the juice solids content of the resulting concentrate or causing scorching of the juice solids.

Accordingly, the finished, primary juice stream needs to be substantially free of pulp if it is to be concentrated. As used herein, "substantially free of pulp" refers to a pulp level of less than about 1% in the finished primary juice stream of pulp greater than 1 mm. Typically, the level of pulp in the finished primary juice stream is as close to 0% as possible. A screw-type or paddle-type finisher fitted with a 0.5 mm screen will typically remove substantially all of the pulp. Once removed, the pulp can be processed further (e.g. pasteurized, frozen) and stored for subsequent inclusion in final juice products or used in other foods and beverages. In addition, it can be mixed with the extractor core material or separately processed in a centrifugal filter to yield additional juice solids.

After removal of pulp, the primary juice stream has a sinking pulp level of about 24 volume % or less. The sinking pulp level will depend on the fruit and the variety. Typically, the sinking pulp level of the finished primary juice stream is from about 10% to about 18% for orange juice. As used herein, "sinking pulp" (also called "background pulp") refers to insoluble materials present in the juice which have a particle size less than about 0.5 mm. Sinking pulp usually results from the shredding or cutting of juice sacs and membrane materials into much finer particles.

The level of sinking pulp can have an important effect on the viscosity of the primary juice stream. Generally, as the level of sinking pulp increases, the viscosity of the primary juice stream likewise increases. The biggest factor affecting the sinking pulp level in a juice is the choice of fruit and the variety.

The level of sinking pulp can be an indicator of how gently the extraction and finishing steps are carried out. Generally, the more gentle the extraction and finishing steps, the lower the level of sinking pulp. Other factors affecting the level of sinking pulp include fruit variety, the condition of the fruit (especially freeze damage) and its physical handling prior to extraction.

The viscosity of the finished primary juice stream is preferably about 25 centipoise or less. This viscosity often needs to be lowered for efficient evaporative concentration of the primary juice stream. Viscosity levels also affect the desirable texture/mouthfeel of juice products. To lower the viscosity of the finished primary juice stream, at least some of the sinking pulp is removed to a sinking pulp level of about 12 volume % or less. (The standard of identity for frozen oragne juice requires that the reconstituted juice have a sinking pulp level of 12% or less.) Orange juice with a sinking pulp level of 12% has a viscosity range of from about 10 to about 20 centipoise.

Removal of sinking pulp from the finished primary juice stream is typically achieved by using centrifugation. However, other separation methods can be used, e.g. filters, juice finishers, belt presses and stationary and vibrating screens.

The primary juice stream is obtained at commercially useful juice yields. Gentle pressure during squeezing (extraction) produces a yield of about 100% or less. The higher the yield, the more pressure used to obtain the juice. Higher yield and higher pressure cause higher peel oil content in the juice and can produce a somewhat lower quality of juice. The advantage of this invention is that juice yield is increased by a recovery process and the best juice quality is achieved through gentle extraction.

Generally, the juice yield for the primary juice stream is at least about 100%, with a typical range of from about 90% to about 110%. (Under the definition below, it is possible to have juice yields in excess of 100%).

For the primary juice stream of the present invention, "juice yield" is based on the total amount of juice solids obtained per box of fruit (processed juice solids yield), relative to the amount of juice solids obtained per box of fruit by using a "state test" juice extractor ("state" juice solids yield) as specified in Florida regulation 20-63.001. In other words, the juice yield can be obtained by the following equation: % juice yield = 100% × (processed juice solids yield)/("state" juice solids yield) where processed juice solids yield = juice yield (per box) from process × (solids content (°Brix) of juice/100) where "state" juice solids yield = juice yield (per box) from "state test" extractor × (solids content (°Brix) of juice/100) × maturity factor

B. Processing Extractor Core Material to Provide Secondary Juice Stream

In addition to the pulp and juice stream, the juice extractor provides residual materials which remain inside the tube of the extractor in a reciprocating cup-type or which are removed in a finisher from other extractors, i.e. reamers. This residual material is hereafter referred to as "extractor core or waste material." This extractor core material is primarily composed of non-juice materials such as rag, seed and, sometimes, peel plugs. However, in addition to these non-juice materials, this core material also contains residual juice solids. Pulp can be added to this material.

The amount of juice solids present in the extractor core material depends upon a number of factors, e.g., the operating conditions and configuration of the extractor and the type and variety of fruit. Typically, this core material contains recoverable residual juice solids on the order of from about 0.8 to about 1.2 pounds per box of oranges processed.

An important characteristic of this core material is its "wetness." Generally, the wetter the core material is, the easier it is to recover the residual juice solids, the higher the yield of secondary juice and the better the quality of this secondary juice. The standard citrus industry method for measuring the wetness of these core materials is by "quick fiber" content. Extractor waste materials suitable for processing herein have a quick fiber content of at least about 60 ml, with a typical range of from about 60 to about 180 ml. Preferred extractor core materials have a quick fiber content of at least about 90 ml, with a preferred range of from about 90 to about 120 ml.

The extractor core material or pulp are processed to recover residual juice solids without any pretreatment or addition of water or other materials. The recovered residual juice solids are 100% juice products which meet the standard of identity set forth by the Florida Dept. of Citrus.

The pulp fraction, and particularly the pulp fraction from heavy extraction, can be processed in the same manner as extractor core material to yield additional juice solids. The pulp is treated in the centrifugal filter under the same conditions as the extractor core materials.

The extractor core material is processed in a centrifugal filter to recover the residual juice solids. Minimizing the time between obtaining this core material from the extractor and processing it in the centrifugal filter is very important. It has been found that the non-juice materials in the extractor core material can act like a "sponge" to absorb and to retain the residual juice solids over time. This can lower the eventual yield of juice solids recovered during processing in the centrifugal filter and also increase the juice viscosity.

The extractor core material or pulp are processed in the centrifugal filter as soon as possible, but in less than about 30 minutes of being obtained from the extractor. Preferably, the materials are processed within about 1 to about 15 minutes, and most preferably in less than about 3 minutes.

Any centrifugal filters suitable for separating liquids from solids can be used in processing the extractor core material. Suitable centrifugal filters include oscillating, tumbler, worm-screen, and push centrifuges. A particularly preferred centrifugal filter is of the worm/screen type. In a worm/screen type centrifuge, the extractor core material is transported from the small to the large diameter end by the combination of the angle of inclination of the screen basket and the slightly different speed of the scraper worm. Depending upon the operating conditions desired, the screen basket can be provided with slotted sieves or preferably perforated sheets. Such a worm/screen centrifuge is a Conturbex centrifuge manufactured by Siebtechnik GmbH of Mulhiem, West Germany.

In processing the core material or pulp in the centrifugal filter, there are essentially three key operating conditions. One is the particular screen opening size of the separator which should be sufficiently small to keep the resulting secondary juice stream from becoming too thick without unduly reducing the yield of juice solids recovered. Preferably, a screen size of about 0.3 mm or smaller is preferred. However, screens in a range of from about 0.1 to about 0.5 mm can be used.

A second key operating condition is the centrifugal force imparted to the material. Preferably, the centrifugal force is maximized to increase the yield of juice solids in the secondary juice stream, but not so great as to cause unduly high levels of peel oil or non-juice materials such as rag and seed to get into the recovered juice. Usually, the centrifugal force is in the range of from about 300 to about 1500 G forces, preferably, in the range of from about 700 to about 1250 G forces.

The third factor is residence time of extractor core material or pulp in the centrifugal filter. Residence times of from about 0.5 sec. to about 15 sec. are used, preferably, from about 1 to about 4 sec.

The level of juice solids recovered frequently depends both on the operating conditions during centrifugal separation and the characteristics of the extractor material processed. Extractor material obtained from early mid-season oranges, the secondary juice stream typically contains from about 0.1 to about 0.3 pounds of juice solids per box of fruit processed. In the case of extractor core materials obtained from Valencia orange fruit, the secondary juice stream typically contains from about 0.1 to about 0.4 pounds of juice solids per box of fruit processed.

The secondary juice stream typically has a higher level of titratable peel oil than the primary juice stream; primarily due to the fact that there are significant amounts of peel components present in the extractor waste material. Usually, the secondary juice stream has a titratable peel oil level of from about 0.15% to about 1.0%. Preferably, this secondary juice stream has a peel oil level as low as possible.

This secondary juice stream can also be much thicker and higher in viscosity relative to the primary juice stream. The particular viscosity of the secondary stream depending on the variety of fruit from which the core material was obtained. For extractor core material obtained from early/mid-season oranges, the viscosity of this secondary juice stream can range from about 400 to about 5000 centipoise, and is typically from about 400 to about 2000 centipoise. For extractor core material obtained from Valencia fruit, the viscosity of this secondary juice stream can range from about 100 to about 500 centipoise.

Because this secondary juice stream can have a significantly higher viscosity,. it may be desirable to remove at least some of the sinking pulp to make it more fluid for subsequent processing. Removal of sinking pulp is frequently done by centrifugation.

An alternative process is to mix the secondary juice stream with the primary juice stream before either is concentrated or further processed.

The residual core material remaining after processing in the centrifugal separator can be discarded or used as cattle fodder or feed, or to make molasses. However, this remaining core material still contains some level of juice solids which would be desirable to recover. These juice solids remaining in the residual core material can be recovered by water washing the core. Any conventional core wash process can be used.

C. Utilization of Primary and Secondary Juice Streams

The primary and secondary juice streams obtained by the method of the present invention can be utilized in 100% juice products or in other juices, beverage or food products.

The secondary juice stream can also be processed directly to provide other juice products. Because of its thickness, the secondary juice stream if often difficult to process without being diluted with other liquids. The secondary juice stream needs to be processed fairly quickly since it tends to become thicker and more viscous over time.

The secondary juice stream can be added directly to the primary juice stream before processing further into 100% juice products. The secondary juice stream can be included at a level of from about 1% to about 33% by weight of the primary juice stream, preferably in an amount of from about 2% to about 20% by weight and most preferably from about 2% to about 7%.

The blending of the secondary juice stream with other materials depends on the final product characteristics. It can be blended to meet the Brix (solids) to acid ratios requirements. Since it tends to contain more pulp, it can be used to increase mouthfeel and texture of a product.

The primary juice stream, as well as combinations of primary and secondary juice streams are concentrated or blended using conventional orange juice processing techniques. For example, in order to preserve the more desirable orange aroma and flavor compounds present, the juice stream can be stripped with steam to remove aroma and flavor volatiles and essences.

The juice stream (stripped or unstripped) can be concentrated by a variety of techniques which typically include freeze concentration of evaporative concentration. A preferred freeze concentration method is disclosed in U.S. Pat. No. 4,374,865 to Strobel, issued Feb. 22, 1983.

Typically, the juice stream is subjected to evaporative concentration. Examples of suitable evaporators for concentrating juice streams include the falling film-type, or, more typically, temperature accelerated short time evaporators (TASTE). See Nagy et al, *Citrus Science and Technology*, Vol. 2 (1977), at pages 217–18 which discloses a standard 7-stage, 4-effect TASTE evaporator system for preparing suitable concentrated orange juice.

The concentrated juice obtained from this process can be formulated into the 100% juice products, or other juice product by appropriate blending with aroma and flavor materials, pulp and water. In the case of juice products containing less than 100% juice, sugar solids such as sucrose and high fructose corn syrup or artificial sweeteners, e.g. aspartame and saccharin, can be included as well. These products can be formulated as either frozen juice concentrate products or as drinkable, single-strength products by appropriate blending of the above ingredients.

D. Specific Illustrations of Dual-Stream Juice Processing According to Present Invention The following are specific illustrations of dual-stream processing of orange fruit according to the present invention:

EXAMPLE I

Early/Mid oranges sized below 3 inches are washed and rinsed with water before extraction. A Food Machinery Corporation extractor, Model No. 291, is used to extract the fruit. The reciprocating extractor is set up with standard extraction components (a 3" cup, a 5/64" peel clearance, a 1" cutter, and a 1" diameter 0.040" perforated strainer tube).

A sample of extracted juice is collected and analyzed for later comparison to the core juice sample. This extracted juice sample is the control for the tests which follow.

The core material from this extractor, which contains the rag, seeds, and peel plugs, are discharged from the orifice tube into a collecting pan. The rest of the intact peel and the fruit material, small strips of peel are removed as the cups come together, are diverted from the collecting pan and are sent to the waste screw conveyor. Thus the material to be processed further, the citrus cores, contains only rag, seeds, and peel plugs along with recoverable residual juice solids.

The citrus cores are then transferred into 5 gallon buckets and divided into 3 sample lots.

Sample 1 (96 lbs) is fed by hand to a Conturbed Worm/Screen Centrifuge, Model 250 at a rate of 5 gpm. The centrifuge is set up using a 0.15 mm hole size screen, a differential speed of 25 rpm between worm and screen, and the inclination angle of the basket of 10°. The basket speed is set at 2000 rpm which generates a G force of approximately 555.

The core material has a quick fiber of 90 ml entering the centrifuge and a quick fiber of 67 ml as it exits. The 5.5 lbs of juice recovered from the cores represents 0.10 lbs sugar solids/box of fruit. This is based on 15 lbs of core/box produced from Early/Mid fruit on an FMC standard 3" extractor.

The juice produced has a Brix of 11.9 versus 10.8 Brix for the control and a Brix/acid ratio of 35.0 versus a 15.0 ratio from the control. Also the peel oil level of the core juice sample is 0.19% versus 0.017% from the control sample. The viscosity of the core juice is 556 cps versus 10 cps for the control.

A second sample of core material from the same fruit is fed to the same centrifuge at all the same conditions except the speed of the basket is raised to 2500 rpm which generates a G force of approximately 868. Ninety and one-half lbs of core is fed to the centrifuge and the quick fiber of the core is reduced to 62 mls. Six lbs of juice is recovered representing 0.12 lbs sugar solids/box. The core juice data shows the following: Brix—11.7; Brix/acid ratio—30.0; peel oil level—0.25%; and the viscosity—548 cps.

A third sample of core material is then run at 3000 rpm on the centrifuge producing a G force of 1250. This core sample weighs 66.5 lbs and produces 6.0 lbs of core juice. The quick fiber on the discharged core is 62 mls. The sugar solids yield from the core is 0.16 lbs/box. The core juice data is as follows: Brix—11.7; Brix/acid ratio—31.6; peel oil level—0.25%; and the viscosity 488 cps.

These three tests show that by increasing basket speed, both the yield and peel oil levels are increased. Thus, higher yield conditions can impact juice quality.

EXAMPLE II

As in Example I Early/Mid oranges are washed and rinsed before being extracted. However, in this test larger than 3" oranges are evaluated using a Food Machinery Corporation extractor, Model No. 391. Standard extraction components for this larger extractor are used (a 4" cup, a 6/64" peel clearance, a 1¼" cutter, a ¾" beam setting, a 7/16" long restrictor, and a 1¼" diameter 0.040" perforated strainer tube).

Again a control sample of extracted juice is collected and analyzed for later comparisons to the core juice sample.

All cores from the larger fruit are collected and fed to the worm screen centrifuge that is set up as in Example I. In this test the centrifuge is run at the 3000 rpm speed (1250 G force).

The core material which weighed 82.95 has a quick fiber value of 107 ml entering the centrifuge and a quick fiber value of 92 ml as it exits. 8.55 lbs of juice is recovered from the cores representing 0.19 lbs sugar solids/box of fruit based on 15 lbs of core/box. The core juice has a Brix of 12.5 and a Brix/acid ratio of 40.3 versus the control values of 11.0 and 15.9 respectively. Also the peel oil level is 0.31% and the viscosity is 2033 cps for the core juice sample. This compares to an oil level of 0.021% for the control sample.

EXAMPLE III

Three inch and under Early/Mid oranges are washed, rinsed, and extracted as in Example I. The same extractor and centrifuge setups are used as described in Example I. The centrifuge again is run at 3000 rpm (1250 G force).

The core juice produced is collected and then added at a 3% by volume basis to single strength primary juice stream and evaporated. A control sample of the same juice without core juice addition is evaporated for comparison.

In this test 1915.5 lbs of core are fed to the centrifuge and produced 128.8 lbs of core juice. This production took about 2 hours. During this time, standard extracted and finished juice is collected and stored in two tanks. To one of these tanks the 128.8 lbs of core juice is added and mixed with the 500 gallons of finished juice. The other tank without core juice is the control.

Both samples are concentrated using evaporation processes.

The non-core juice sample is evaporated first to a final Brix of 64.3°. The initial Brix is 12.3. The evaporation rate is 7293 lbs/hour. For the core juice added batch the feed Brix is 12.2 and the final Brix is 64.6, respectively. The evaporation rate is 7315 lbs/hour.

Samples of feed juice to the evaporator and of the concentrate produced are collected and analyzed. Concentrate samples are also submitted for USDA flavor analysis and the results showed no difference in flavor scores between the test and control product. The physical analyses are shown in the Table below.

|  | Core Juice | Feed Juice w/3% core Juice | Feed Juice Control | Concentrate w/3% Core Juice | Concentrate Control |
|---|---|---|---|---|---|
| Brix | 13.9 | 12.2 | 12.3 | 64.6 | 65.3 |
| Ratio | 33.9 | 15.1 | 15.0 | 15.3 | 14.9 |
| Oil | 0.196 | 0.025 | 0.021 | — | — |
| Viscosity | 3573 | 13.7 | 12.6 | 8663 | 7070 |

E. Analytical Methods Section

1. Viscosity

The viscosity is measured using a Brookfield Synchro-Lectric ULV viscometer.

A number 3 spindle and 60 rpm setting is used. The juice sample is screened through a 20-mesh screen and placed in an 8 oz. jar sample. The viscometer is leveled. The measurements are taken at room temperature as quickly as possible, usually within 5 minutes. Three readings are taken at 30-second intervals.

The viscosity is calculated by multiplying the average dial reading by a factor of 20.

2. Volume % Sinking Pulp

The concentrate sample is stirred enough to obtain a uniform sample. Water is added to dilute the concentrated sample to 11.8° Brix. Pulp is removed from the diluted sample by passing it through a 20 mesh screen having an opening of about 0.5 mm. The screened sample is equilibrated to a temperature of 80°±2° F. Two conical 50 ml. graduated tubes are then filled with exactly 50 ml. each of the well-mixed, equilibrated sample. The tubes are placed in the centrifuge (IEC Model HN-SII, IEC Centrifuge Head #215, IEC Trunnion rings #325, IEC Shields #320) so that the graduated scale faces the direction of rotation. With the load balanced, the samples are centrifuged at 1500 rpm for 10 minutes. The level of pulp at the bottom of each tube is read to the nearest ml. and then multiplied by 2 to get the volume % of sinking pulp. The values for the tubes are averaged to obtain the volume % of sinking pulp for sample.

3. Quick Fiber Test (a) Place 40-mesh screen basket in Quick Fiber Device (manufactured by FMC).

(b) From a fresh, representative and well-mixed sample weigh a 200 gm sample into 1 liter beaker.

(c) To the weighed sample, add 200 ml of water. Mix by stirring for 1 minute. Permit the sample-water mixture to stand for 3 minutes and then again mix by stirring for 1 minute.

(d) Immediately transfer the above core-water mixture to the 40-mesh screen basket. Turn on the Quick Fiber Device and permit to shake for 3 minutes. Collect and measure the volume of all the free liquid recovered by the screening procedure.

(e) The volume in milliliters (ml) of the liquid recovered indicates the relative dryness of the core material.

What is claimed is:

1. A method for processing citrus fruit to provide improved juice yields, which comprises the steps of:
   a. processing citrus fruit in a reciprocating cup-type extractor to provide a primary juice stream and extractor core material; and
   b. processing the extractor core material having a quick fiber content of at least 60 ml in a centrifugal filter to provide a secondary juice stream, said processing being carried out at a centrifugal force of from about 300 G to about 1500 G force for a period of from about 0.5 sec to 15 sec.

2. A process according to claim 1 wherein the juice is selected from the group consisting of orange, grapefruit and lemon.

3. A process according to claim 2 wherein the centrifugal filter has a screen size of from about 0.1 mm to about 0.5 mm.

4. A process according to claim 2 wherein the juice is orange juice.

5. A process according to claim 2 wherein the centrifugal force is from about 700 G to about 1250 G.

6. A process according to claim 5 wherein the residence time is from about 1 sec to about 4 sec.

7. A process according to claim 6 wherein the quick fiber content is from about 90 ml to about 120 ml.

8. A process according to claim 7 wherein the juice is orange juice.

9. A process according to claim 2 wherein the juice yield based on the total amount of juice solids obtained per box of fruit, relative to the amount of juice solids obtained per box of fruit by using a "state test" juice extractor for step (a) is from about 90% to about 110%.

10. A process according to claim 9 wherein the residence time is from about 1 sec. to about 4 sec., and the screen size is from about 0.1 mm to about 0.3 mm.

11. A process according to claim 11 wherein the secondary juice stream is blended with the primary juice stream at a secondary juice stream level of from about 1% to about 33% by weight of the primary juice stream and then concentrated.

12. A process according to claim 12 wherein the level of secondary juice stream is from about 2% to about 7% by weight of the primary juice stream.

13. A process according to claim 12 wherein said juice is orange juice.

14. A method for processing citrus extractor core material to recover juice comprising processing the extractor core material in a centrifugal filter at a centrifugal force of from about 300 G to about 1500 G force for a period of from about 0.5 sec. to about 15 sec.

15. A method according to claim 14 wherein the extractor core material is derived from oranges.

16. A method according to claim 15 wherein the centrifugal filter has a screen size of about 0.3 mm or less.

17. A method according to claim 16 wherein the residence time is from about 1 sec. to about 4 sec.

* * * * *